United States Patent [19]
Fuchs et al.

[11] Patent Number: 5,604,286
[45] Date of Patent: Feb. 18, 1997

[54] CAOUTCHOUC MIXTURE, TREAD MADE THEREFROM AND TIRE WITH THIS TREAD

[75] Inventors: Hans-Bernd Fuchs, Alzenau-Hörstein; Günter Dietrich, Frankfurt am Main; Ulrich Steinbrecht, Ober-Ramstadt, all of Germany

[73] Assignee: SP Reifenwerke GmbH, Hanau, Germany

[21] Appl. No.: 373,392

[22] Filed: Jan. 17, 1995

[30] Foreign Application Priority Data

Jan. 24, 1994 [DE] Germany ............... 44 01 935.1

[51] Int. Cl.⁶ ................................................. C08K 3/00
[52] U.S. Cl. .................. 524/493; 524/495; 524/496; 524/573
[58] Field of Search ......................... 524/493, 495, 524/496, 573

[56] References Cited

U.S. PATENT DOCUMENTS

| | | | |
|---|---|---|---|
| 4,843,120 | 6/1989 | Halasa et al. | 525/53 |
| 5,087,668 | 2/1992 | Standstram | 525/237 |
| 5,227,425 | 7/1993 | Rauline | 524/493 |
| 5,239,023 | 8/1993 | Hsu et al. | 526/141 |
| 5,405,927 | 4/1995 | Hsu et al. | 526/337 |

FOREIGN PATENT DOCUMENTS 620250 of 0000 European Pat. Off.

*Primary Examiner*—Edward J. Cain
*Attorney, Agent, or Firm*—Birch, Stewart, Kolasch & Birch, LLP

[57] ABSTRACT

A caoutchouc mixture vulcanisable with sulphur, tire treads manufactured therefrom and also tires with these vulcanised tire treads are proposed. The caoutchouc mixture contains 30 to 100 parts by weight of isoprene-butadiene copolymer, 0 to 70 parts by weight of one or more further elastomers, 20 to 90 parts by weight of silica as a filler material, customary additives and also a vulcanisation system, with all parts by weight being related to 100 parts by weight of total elastomers. This caoutchouc mixture delivers tire treads with good resistance to abrasion and a low loss factor which is correlated with a low rolling resistance.

11 Claims, No Drawings

CAOUTCHOUC MIXTURE, TREAD MADE THEREFROM AND TIRE WITH THIS TREAD

The present invention relates to a caoutchouc mixture vulcanisable with sulphur and containing at least one elastomer, at least one filler, customary additives and also a vulcanisation system. Furthermore, the invention relates to tire treads which contain this caoutchouc mixture and also to tires with a tire tread which contains the vulcanised caoutchouc mixture.

The characteristics desired in tires can only be simultaneously realised with difficulty because they are partly contradictary. Thus measures which lead to a reduction of the rolling resistance bring about a reduction of the resistance to abrasion (or scuffing resistance). The partial or complete substitution of carbon black by the filler material silica, for example, admittedly reduces the rolling resistance of the tire but leads to deterioration of its resistance to abrasion. In EP 0 299 074 B1 it is proposed, in order to avoid this deterioration, that polymers which are modified with a special silane compound should be used for caoutchouc mixtures which contain large proportions of silica as a filler material. This measure is however unfavourable for industrial utilisation because of the use of special silane compounds.

In order to avoid this disadvantage a caoutchouc mixture is proposed in EP 0 501 227 which contains a copolymer of a conjugated diene and vinyl aromatic compound manufactured by solution polymerisation in a hydrocarbon solvent, a very special silica which is for example manufactured by the process described in EP 0 157 703 B1, customarily used additives and also a vulcanisation system. This caoutchouc mixture is manufactured in known manner by the stepwise mixing of the components, with temperatures being kept to at which cross-linking does not yet arise. A further dien elastomer, such as for example polyisoprene, natural caoutchouc or polybutadiene can be added to the caoutchouc mixture for dilution.

In the examples and comparative examples of this reference tire treads are compared with one another which were manufactured from caoutchouc mixtures which contain stirene butadiene copolymers manufactured by emulsion polymerisation (known in the following as emulsion SBR) and special silica or classical silica or carbon black as a filler material or, alternatively, which contain stirene butadiene copolymers manufactured by solution polymerisation (known in the following as solution SBR) and special silica or carbon black as a filler material. From the quoted results it can be deduced that treads with emulsion SBR and carbon black have a good working life when subjected to abrasion but a poor rolling resistance, that treads with emulsion SBR and classical silica have a poor working life when subjected to abrasion but a good rolling resistance and that the treads claimed in EPO 501 227 A1, i.e. treads with solution SBR and special silica provide good results both with respect to rolling resistance and also with respect to the working life when subjected to abrasion.

The object of the invention is to make available caoutchouc mixtures which already lead to good results with respect to the resistance to abrasion and with respect to the rolling resistance in tire treads with classical silica.

Starting from the initially named caoutchouc mixture vulcanisable with sulphur this object is satisfied in that the caoutchouc mixture contains 30 to 100 parts by weight of isoprene-butadiene copolymer, 0 to 70 parts by weight of one or more further elastomers and also 20 to 90 parts by weight of silica as filler material, with all proportions by weight being related to 100 parts by weight of total elastomers.

Furthermore, tire treads which contain this caoutchouc mixture and also tires which have such treads vulcanised with sulphur form the subject of the invention.

It has surprisingly been found that caoutchouc mixtures with this composition lead to a resistance to abrasion which is comparable with that of the corresponding caoutchouc mixtures which only contain carbon black as a filler material, but have a substantially lower tan $\delta$ (loss factor) than the corresponding caoutchouc mixtures with carbon black as a filler material. A lower tan $\delta$ is correlated with a lower rolling resistance. As can be found from the test results with respect to EPO 0 501 227 A1 the improved rolling resistance achieved with the substitution of classical silica for carbon black is bought at the expense of a substantial deterioration of the resistance to abrasion in so far as the caoutchouc mixtures contain emulsion SBR or solution SBR as elastomer. In accordance with the invention a deterioration of the resistance to abrasion is avoided even when using classical silica in that the caoutchouc mixture contains 30 to 100 parts by weight of isoprene-butadiene copolymer related to 100 parts by weight of the total elastomers.

The caoutchouc mixture of the invention can be used for the manufacture of tire treads which are suitable for the tires of motorcars, motorcycles, 4×4 cross country vehicles, transporters and light trucks.

The caoutchouc mixture preferably contains 50 to 100 parts by weight of isoprene-butadiene copolymer related to 100 parts by weight of total elastomers and in particular preferably contains 70 to 100 parts by weight thereof.

The isoprene-butadiene copolymer preferably has a glass transition temperature (Tg) in the range from −90° C. to +20° C. determined in accordance with the torsional pendulum method. The isoprene-butadiene copolymer preferably consists of 30 to 90 parts by weight of butadiene and the complementary part isoprene and particularly preferably consists of 60 to 80% by weight butadiene and the complementary part isoprene.

In the copolymer the butadiene preferably has a 1,2 bond content of 10 to 70 parts by weight and the isoprene a 3,4 bond content of 20 to 70% by weight. With isoprene and butadiene the complementary percentage is in each case the 1,4 bond content.

As further elastomers the caoutchouc mixtures of the invention can preferably contain 0 to 50 parts by weight of natural caoutchouc, 0 to 50 parts by weight of a copolymer of conjugated diene and vinyl aromatic compound manufactured by emulsion polymerisation and/or 0 to 30 parts by weight of polybutadiene, with all parts by weight being respectively related to 100 parts by weight of total elastomers. The total content of these further elastomers in the caoutchouc mixture of the invention can amount to 0 to 70 parts by weight related to 100 parts by weight of total elastomers. 1,3-butadiene, isoprene and 2,3-dimethyl-1,3-butadiene are suitable as the conjugated diene of the copolymer formed by emulsion polymerisation. Stirene and o-, m- and p-methyl stirene are suitable as the vinyl aromatic compound of the copolymer. Stirene-butadiene copolymer with a glass transition temperature between −20° C. and −70° C. determined in accordance with the torsional pendulum method is preferably the copolymer. Polybutadiene with a 1,4-cis-bond content, in particular a bond content above 90% is preferably used.

The elastomers can be used in the form of oil extended polymers. As a rule the total oil content of the caoutchouc mixture, i.e. the free oil and oil content of the elastomers can lie in the range from 10 to 50 parts by weight per 100 parts by weight of total elastomers.

As a filler material the caoutchouc mixture of the invention contains silica in a quantity of 20 to 90 parts by weight per 100 parts by weight of total elastomer content. Both "classical" silica and also silica with an optimised dispersibility in the caoutchouc mixture can be used as the silica. Under the term "classical" silica there is to be understood silica which is normally used for the manufacture of tires and which is offered as a commercial product from various manufacturers. These silicas normally have a BET surface between 100 and 250 m$_2$/g in accordance with DIN 66 131, ISO 5794/1 Annex D, a CTAB surface between 100 and 250 m$_2$/g in accordance with ISO 6810, ASTM D-3765 and an oil take-up measured with DBP between 150 and 250 ml/100 g in accordance with ISO S-4656, ASTM D-2414, DIN 53601. Silica as described in EP-0 157 703 B1 can for example be used as the silica with optimised dispersability.

The caoutchouc mixture preferably contains 50 to 80 parts by weight of silica per hundred parts by weight of total elastomers.

The caoutchouc mixture of the invention can contain carbon black as a further filler material. The carbon black content should not be higher than the silica content and the total content of filler materials should not be greater than 90 parts by weight related to 100 parts by weight of total elastomers. In addition carbon black can be present in the reinforcing filler. As customary additives the caoutchouc mixture of the invention can contain aromatic and/or naphthenic oils, reinforcing fillers (intensifiers), aging protection means, tackifiers, activators and processing aids. All these additives are used in the customary range of quantities. If one part of the silica is replaced by carbon black then the reinforcing filler is added in a smaller quantity. Furthermore, the caoutchouc mixture of the invention contains a vulcanisation system with sulphur and vulcanisation accelerators.

The caoutchouc mixture can be manufactured in accordance with the following multi-stage process. In a first stage the elastomer or elastomers is/are mixed with the customary additives and the silica in a kneader. During this the temperature should not rise to values at which cross-linking already sets in. Customarily temperatures of 160° to 170° C. should not be exceeded. After the cooling down of the mixture it is kneaded again in a second stage and again the temperature should not rise to values at which cross-linking takes place. In a subsequent, third, stage the vulcanisation system is worked in on a roll and during this the temperatures are again kept to below the cross-linking temperature. The times for the mixing processes in the individual stages are in each case so dimensioned that a good through-mixing of the components is achieved.

The invention will be explained in more detail with reference to the following examples.

The characteristics of the caoutchouc mixtures of the invention and of the caoutchouc mixtures manufactured for comparison purposes were determined from respective vulcanised test bodies made from the mixtures. For the determination of the loss factor (tan δ) reference should be made to DIN 53513. The abrasion resistance was determined in accordance with DIN 53516.

Six caoutchouc mixtures with the composition set forth in the following table were manufactured and in each case the parts by weight of the components in the mixtures are set forth. The mixtures 1 to 3 are mixtures in accordance with the invention, the mixtures 4 to 6 are comparison mixtures.

TABLE

| CAOUTCHOUC MIXTURE | 1 | 2 | 3 | 4 | 5 | 6 |
| --- | --- | --- | --- | --- | --- | --- |
| Components | | | | | | |
| Copolymer a | 100 | | | 100 | | |
| Copolymer b | | 100 | | | 100 | |
| Copolymer c | | | 100 | | | 100 |
| Silica VN3 | 65 | 65 | 65 | | | |
| Carbon black N234 | | | | 65 | 65 | 65 |
| Reinforcing fillers | 10.4 | 10.4 | 10.4 | | | |
| Zinc oxide | 3 | 3 | 3 | 3 | 3 | 3 |
| Stearic acid | 2 | 2 | 2 | 2 | 2 | 2 |
| Aromatic oil | 16 | 16 | 16 | 16 | 16 | 16 |
| Aging protection means | 2 | 2 | 2 | 2 | 2 | 2 |
| Tackifier | 1.5 | 1.5 | 1.5 | 1.5 | 1,,5 | 1.5 |
| Vulcanisation accelerator A | 1.7 | 1.7 | 1.7 | 1.3 | 1.3 | 1.3 |
| Vulcanisation accelerator B | 1.5 | 1.5 | 1.5 | 0.3 | 0.3 | 0.3 |
| Sulpur | 1.4 | 1.4 | 1.4 | 1.7 | 1.7 | 1.7 |
| Reference values with respect to the measured tan δ at 70° C. | 140 | 144 | 149 | 100 | 105 | 107 |
| Working life when subjected to abrasion | 102 | 100 | 97 | 100 | 105 | 101 |

The components set forth in the above tables are explained in the following:

Copolymer a: Anionic polymerised isoprene-butadiene copolymer with 80% by weight of butadiene and 20% by weight of isoprene, with the 1,2 bonds in the butadiene component amounting to 52% by weight and the 3,4 bonds in the isoprene component amounting to 36% by weight. The complementary percentage in the butadiene and isoprene component is in each case present as 1,4 bonds.

Copolymer b: Anionic polymerised isoprene-butadiene copolymer with 80% by weight of butadiene and 20% by weight of isoprene, with the 1,2 bonds in the butadiene component amounting to 38% by weight and the 3,4 bonds in the isoprene component amounting to 60% by weight. The complementary percentage in the butadiene and isoprene component is in each case present as 1,4 bonds.

Copolymer c: Anionic polymerised isoprene-butadiene copolymer with 75% by weight of butadiene and 25% by weight of isoprene, with the 1,2 bonds in the butadiene component amounting to 40% by weight and the 3,4 bonds in the isoprene component amounting to 60% by weight. The complementary percentage in the butadiene and isoprene component is in each case present as 1,4 bonds.

Silica VN3: BET surface 170 m$^2$/g, commercial product of Degussa Ultrasil$^R$ VN3 granulate.

Carbon black N 234: BET surface 125 m$^2$/g determined in accordance with ISO S-4652, ASTM D-3037, DIN 66132; CTAB surface 120 m$^2$/g determined in accordance with ISO 6810, ASTM D-3765; DBP absorption 125 ml/100 g determined in accordance with ISO S-4656, ASTM D-2414, DIN 53601.

Reinforcing filler: Mixture in the ratio 1:1 of carbon black N 330 and polysulphidic organosilane, commercial product of Degussa X 50-S.

Aging protection means: Mixed di-aryl-p-phenylene diamine.

Tackifier: Condensation products of p-tert.-octyl phenol and formaldehyde.

Vulcanisation accelerater A: CBS (N-cyclohexyl-2-benzo-thiazol sulfenamide).

Vulcanisation accelerater B: DPG (N,N'-diphenyl guanidine).

The caoutchouc mixtures 1 to 6 were each manufactured as follows. In a kneader with a kneader temperature of 50° C. and a speed of kneader rotation of 50 per min the elastomers were added in a first stage and kneaded. Then zinc oxide, stearic acid, aging protection means and tackifier were added and kneaded in. Thereafter one half of the silica, of the reinforcing filler and of the aromatic oil were added and kneaded in in the case of each of the mixtures 1 to 3, and one half of the carbon black and of the aromatic oil were added and kneaded in in the case of each of the mixtures 4 to 6. Finally, the second half of the above named components was added and kneaded in in each case. During the entire mixing process a maximum temperature of 160° C. was kept to.

After the mixtures had cooled down they were kneaded again in a second stage and again a temperature of 160° C. was not exceeded. The second stage was only carried out for the caoutchouc mixtures 1 to 3 but not however for the carbon black mixtures. Finally, in a third stage (the second stage for the mixtures 4 to 6), the vulcanisation system comprising sulphur and vulcanisation accelerators were mixed in on a roll. During this a temperature below the cross-linking temperature was again kept to.

The abrasion and the loss factor tan δ were determined from test bodies manufactured from the caoutchouc mixtures. The value 100 was associated with the values measured for the caoutchouc mixture 4 and the values measured for the other caoutchouc mixtures were then set forth in the table as relative values in relation to the reference value 100. Values of 100 signify an improvement of the characteristics.

As can be deduced from the values set forth in the table, the working life when subjected to abrasion for the caoutchouc mixtures of the invention is approximately comparable with the working life when subjected to abrasion of the corresponding caoutchouc mixtures which contain carbon black instead of silica. This was not to be expected since, in accordance with the statements made in EPO 501 227 A1 the substitution of silica for carbon black leads to a substantial deterioration of the working life when subjected to abrasion, providing the caoutchouc mixture contains emulstion SBR or solution SBR. With the caoutchouc mixture of the invention one thus obtains a strong improvement of the tan δ which correlates with the rolling resistance; however, without deterioration of the working life when subjected to abrasion.

We claim:

1. Caoutchouc mixture vulcanisable with sulphur and containing at least one elastomer, at least one filler, customary additives and also a vulcanisation system, characterised in that the caoutchouc mixture contains 30 to 100 parts by weight of isoprene-butadiene-copolymer, 0 to 70 parts by weight of one or more further elastomers and also 50 to 90 parts by weight of silica as filler, with all parts by weight being respectively related to 100 parts by weight of total elastomers, the butadiene of the copolymer having a 1,2 bond content of 10 to 70 parts by weight and the isoprene of the copolymer having a 3,4 bond content of 20 to 70 parts by weight.

2. Caoutchouc mixture in accordance with claim 1, characterised in that the isoprene-butadiene-copolymer consists of 30 to 90 parts by weight butadiene and the complementary part isoprene.

3. Caoutchouc mixture in accordance with claim 2, characterised in that the isoprene-butadiene-copolymer consists of 60 to 80 parts by weight of butadiene and the complementary part isoprene.

4. Caoutchouc mixture in accordance with claim 1 characterised in that it contains 50 to 100 parts by weight of isoprene-butadiene-copolymer related to 100 parts by weight total elastomers.

5. Caoutchouc mixture in accordance with, claim 1 characterised in that it contains as further elastomers 0 to 50 parts by weight of natural caoutchouc, 0 to 50 parts by weight of a copolymer of conjugated diene and vinyl aromatic compound manufactured by emulsion polymerisation and/or 0 to 30 parts by weight of polybutadiene, with all parts by weight being respectively related to 100 parts by weight of total elastomers.

6. Caoutchouc mixture in accordance with claim 5, characterised in that it contains stirene-butadiene-copolymer with a glass transition temperature between −20° C. and −70° C. manufactured by emulsion polymerisation.

7. Caoutchouc mixture in accordance with claim 1, characterised in that the silica has a BET surface between 150 and 250 m²/g.

8. Caoutchouc mixture in accordance with claim 1, characterised in that it contains carbon black as a further filler, with the proportion of carbon black being at most the same size as the proportion of silica.

9. Caoutchouc mixture in accordance with claim 1, characterised in that the isoprene-butadiene-copolymer has a glass transition temperature Tg of −90° C. to +20° C.

10. Tyre tread, characterised in that it contains a caoutchouc mixture vulcanisable with sulphur in accordance with claim 1.

11. Tyre, characterised in that it contains a tire tread in accordance with claim 10 vulcanised with sulphur.

* * * * *